US009934376B1

(12) United States Patent
Ismael

(10) Patent No.: US 9,934,376 B1
(45) Date of Patent: Apr. 3, 2018

(54) MALWARE DETECTION APPLIANCE ARCHITECTURE

(71) Applicant: FireEye, Inc., Milpitas, CA (US)

(72) Inventor: Osman Abdoul Ismael, Palo Alto, CA (US)

(73) Assignee: FireEye, Inc., Milpitas, CA (US)

(*) Notice: Subject to any disclaimer, the term of this patent is extended or adjusted under 35 U.S.C. 154(b) by 2 days.

(21) Appl. No.: 14/962,497

(22) Filed: Dec. 8, 2015

Related U.S. Application Data

(60) Provisional application No. 62/097,499, filed on Dec. 29, 2014.

(51) Int. Cl.
G06F 21/00 (2013.01)
G06F 21/55 (2013.01)
G06F 9/455 (2018.01)

(52) U.S. Cl.
CPC ........ G06F 21/552 (2013.01); G06F 9/45558 (2013.01); *G06F 2009/45587* (2013.01); *G06F 2009/45591* (2013.01); *G06F 2221/034* (2013.01)

(58) Field of Classification Search
None
See application file for complete search history.

(56) References Cited

U.S. PATENT DOCUMENTS 8,201,246 B1  6/2012  Wu et al.
8,271,978 B2  9/2012  Bennett et al.
8,479,286 B2  7/2013  Dalcher et al.
8,479,292 B1  7/2013  Li et al.
(Continued)

FOREIGN PATENT DOCUMENTS

WO  WO2012/135192  10/2012
WO  WO2012/154664  11/2012
(Continued)

OTHER PUBLICATIONS

Steinberg et al., "NOVA: A Microhypervisor-Based Secure Virtualization Architecture", (EuroSys '10), ACM, 2010, p. 209-222.*
(Continued)

*Primary Examiner* — Jeffery Williams
(74) *Attorney, Agent, or Firm* — Rutan & Tucker, LLP

(57) ABSTRACT

A threat-aware virtualization module may be deployed in a malware detection appliance architecture and execute on a malware detection system (MDS) appliance to provide exploit and malware detection within a network environment. The virtualization module may underlie an operating system kernel of the MDS appliance and execute in kernel space of the architecture to control access to kernel resources of the appliance for any operating system process. A type 0 virtual machine monitor may be disposed over the virtualization module and execute in user space of the architecture as a pass-through module configured to expose the kernel resources of the appliance to the operating system kernel. One or more hypervisors, e.g., type 1 VMM, may be further disposed over the virtualization module and execute in user space of the architecture under control of the virtualization module to support execution of one or more guest operating systems inside one or more full virtual machines.

21 Claims, 6 Drawing Sheets

(56) References Cited

U.S. PATENT DOCUMENTS

| | | | |
|---|---|---|---|
| 8,522,236 | B2 | 8/2013 | Zimmer et al. |
| 8,775,715 | B2 | 7/2014 | Tsirkin et al. |
| 8,832,352 | B2 | 9/2014 | Tsirkin et al. |
| 8,839,245 | B1 | 9/2014 | Khajuria et al. |
| 9,003,402 | B1 | 4/2015 | Carbone et al. |
| 9,092,625 | B1 | 7/2015 | Kashyap |
| 9,218,489 | B2 * | 12/2015 | Mooring ............. G06F 9/45558 |
| 9,223,962 | B1 * | 12/2015 | Kashyap ............... G06F 21/566 |
| 2003/0120856 | A1 | 6/2003 | Neiger et al. |
| 2005/0216759 | A1 | 9/2005 | Rothman et al. |
| 2006/0130060 | A1 | 6/2006 | Anderson et al. |
| 2006/0248528 | A1 | 11/2006 | Oney et al. |
| 2007/0174915 | A1 | 7/2007 | Gribble et al. |
| 2007/0180454 | A1 | 8/2007 | Fujimoto et al. |
| 2007/0300227 | A1 | 12/2007 | Mall et al. |
| 2008/0028124 | A1 | 1/2008 | Tago |
| 2008/0065854 | A1 | 3/2008 | Schoenberg et al. |
| 2008/0244206 | A1 | 10/2008 | Heo et al. |
| 2008/0294808 | A1 | 11/2008 | Mahalingam et al. |
| 2009/0106754 | A1 | 4/2009 | Liu et al. |
| 2009/0172661 | A1 | 7/2009 | Zimmer et al. |
| 2010/0023810 | A1 | 1/2010 | Stolfo et al. |
| 2010/0254622 | A1 | 10/2010 | Kamay et al. |
| 2010/0299665 | A1 | 11/2010 | Adams |
| 2011/0004935 | A1 | 1/2011 | Moffie et al. |
| 2011/0047542 | A1 | 2/2011 | Dang et al. |
| 2011/0047544 | A1 | 2/2011 | Yehuda et al. |
| 2011/0153909 | A1 | 6/2011 | Dong |
| 2011/0167422 | A1 | 7/2011 | Eom et al. |
| 2011/0296412 | A1 | 12/2011 | Banga et al. |
| 2011/0314546 | A1 | 12/2011 | Aziz et al. |
| 2012/0047580 | A1 | 2/2012 | Smith et al. |
| 2012/0254995 | A1 | 10/2012 | Sallam |
| 2012/0255002 | A1 | 10/2012 | Sallam |
| 2012/0255016 | A1 | 10/2012 | Sallam |
| 2012/0255017 | A1 | 10/2012 | Sallam |
| 2012/0255021 | A1 | 10/2012 | Sallam |
| 2012/0266244 | A1 * | 10/2012 | Green ................... G06F 21/566 726/24 |
| 2012/0311708 | A1 | 12/2012 | Agarwal et al. |
| 2013/0031374 | A1 | 1/2013 | Thom et al. |
| 2013/0055256 | A1 | 2/2013 | Banga et al. |
| 2013/0145471 | A1 | 6/2013 | Richard et al. |
| 2013/0191924 | A1 | 6/2013 | Tedesco et al. |
| 2013/0282776 | A1 | 10/2013 | Durrant et al. |
| 2013/0305006 | A1 | 11/2013 | Altman et al. |
| 2013/0333033 | A1 | 12/2013 | Khesin |
| 2013/0346966 | A1 | 12/2013 | Natu et al. |
| 2013/0347131 | A1 * | 12/2013 | Mooring ............. G06F 9/45558 726/29 |
| 2014/0351810 | A1 | 11/2014 | Pratt |
| 2015/0007326 | A1 * | 1/2015 | Mooring ............. G06F 9/45558 726/24 |
| 2015/0199531 | A1 | 7/2015 | Ismael et al. |
| 2016/0006756 | A1 | 1/2016 | Ismael |
| 2016/0099951 | A1 * | 4/2016 | Kashyap ............... H04L 63/145 726/23 |
| 2016/0132351 | A1 * | 5/2016 | Kashyap ............... G06F 21/566 718/1 |

FOREIGN PATENT DOCUMENTS

| | | |
|---|---|---|
| WO | WO-2012/177464 A1 | 12/2012 |
| WO | WO-2013/09122 A1 | 6/2013 |
| WO | WO-2014/004747 A2 | 1/2014 |

OTHER PUBLICATIONS

Amiri Sani, Ardalan, et al. "I/O paravirtualization at the device file boundary." ACM SIGPLAN Notices 49.4 (2014), pp. 319-332.

Bias, Randy "Micro Virtual machines", Jul. 12, 2007, retrieved on line http://web.archive.org/web/20100920064755/http://cloudscalling.com/blog/cloud-computing/technology/micro-virtual-machines, retrieved on Nov. 12, 2015, 2 Pages.

Bromium Corp, "Bromium vSentry, Defeat of the Unknown Attack," downloaded from http://www.bromium.com/sites/default/files/Bromium-Whitepaper-vSentry_2.pdf on Dec. 1, 2013, 11 pages.

Bromium Corp, "Live Attack Visualization and Analysis, What does a Malware attack look like?" http://www.bromium.com/sites/default/files/Bromium%20LAVA%20WP_2.pdf on Dec. 1, 2013, 11 pages.

Bromium Corp, "Bromium vSentry—Defeat the Unknown Attack," Oct. 10, 2013, 11 pages.

Chen, Peter M., and Brian D. Noble. "When virtual is better than real [operating system relocation to virtual machines]." Hot Topics in Operating Systems, 2001. Proceedings of the Eighth Workshop on. IEEE, 2001, 6 pages.

*Common Criteria for Information Technology Security Evaluation Part 3: Security Assurance Components*, Sep. 2012, Ver. 3.1 (CCMB-2012-09-003), 233 pages.

Gao, Debin, Michael K. Reiter, and Dawn Xiaodong Song. "On Gray-Box Program Tracking for Anomaly Detection." USENIX security symposium. 2004, 16 pages.

Garfinkel, Tal, and Mendel Rosenblum. "A Virtual Machine Introspection Based Architecture for Intrusion Detection." NDSS. 2003, 16 pages.

Heiser, Gernot, and Ben Leslie. "The OKL4 Microvisor: Convergence point of microkernels and hypervisors." Proceedings of the first ACM asia-pacific workshop on Workshop on systems. ACM, 2010, 5 pages.

Hofmeyr, Steven A., Stephanie Forrest, and Anil Somayaji. "Intrusion detection using sequences of system calls." Journal of computer security 6.3 (1998): 151-180.

Huang, Yih, et al. "Efficiently tracking application interactions using lightweight virtualization." Proceedings of the 1st ACM workshop on Virtual machine security. ACM, 2008, 9 pages.

Iqbal, Asif, Nayeema Sadeque, and Rafika Ida Mutia. "An overview of microkernel, hypervisor and microvisor virtualization approaches for embedded systems." Report, Department of Electrical and Information Technology, Lund University, Sweden 2110 (2009), 15 Pages.

Iqbal, et al.,—"An Overview of Microkernel, Hypervisor and Microvisor Virtualization Approaches for Embedded Systems," Department of Electrical and Information Technology, Lund University, Sweden, Aug. 26, 2013, 15 pages.

Jiang, Xuxian, Xinyuan Wang, and Dongyan Xu. "Stealthy malware detection through vmm-based out-of-the-box semantic view reconstruction." Proceedings of the 14th ACM conference on Computer and communications security. ACM, 2007, 11 pages.

Jones, Stephen T., Andrea C. Arpaci-Dusseau, and Remzi H. Arpaci-Dusseau. "Antfarm: Tracking Processes in a Virtual Machine Environment." USENIX Annual Technical Conference, General Track. 2006, 14 pages.

Kapravelos, Alexandros, et al. "Revolver: An Automated Approach to the Detection of Evasive Web-based Malware." USENIX Security Symposium. 2013, 16 pages.

King, Samuel T., and Peter M. Chen. "SubVirt: Implementing malware with virtual machines." Security and Privacy, 2006 IEEE Symposium on. IEEE, 2006, 14 Pages.

Kosoresow, Andrew P., and Steven A. Hofmeyr. "Intrusion detection via system call traces." IEEE software 14.5 (1997): 35-42.

Laureano, Marcos, Carlos Maziero, and Edgard Jamhour. "Intrusion detection in virtual machine environments." Euromicro Conference, 2004. Proceedings. 30th. IEEE, 2004, 6 pages.

Levin, Thomas E., Cynthia E. Irvine, and Thuy D. Nguyen. Least privilege in separation kernels. Naval Postgraduate School Monterey CA Dept of Computer Science, 2006 8 pages.

Nguyen, Anh M., et al. "Mavmm: Lightweight and purpose built vmm for malware analysis." Computer Security Applications Conference, 2009. ACSAC'09. Annual. IEEE, 2009, 10 pages.

PCT Notification of Transmittal of the International Search Report and the Written Opinion of the International Searching Authority, or the Declaration, International Searching Authority, International Application No. PCT/US2014/071847, dated Mar. 26, 2015, 16 pages.

(56) References Cited

OTHER PUBLICATIONS

PCT Notification of Transmittal of the International Search Report and the Written Opinion of the International Searching Authority, or the Declaration, International Searching Authority, International Application No. PCT/US2014/071879, dated Apr. 28, 2015, 12 pages.

PCT Notification of Transmittal of the International Search Report and the Written Opinion of the International Searching Authority, or the Declaration, International Searching Authority, International Application No. PCT/US2014/071923, dated Mar. 26, 2015, 13 pages.

Steinberg, Udo, and Bernhard Kauer. "NOVA: a microhypervisor-based secure virtualization architecture." Proceedings of the 5th European conference on Computer systems. ACM, 2010, 14 pages.

Stumpf, Frederic, et al. "An approach to a trustworthy system architecture using virtualization." Autonomic and trusted computing. Springer Berlin Heidelberg, 2007. 191-202, 12 pages.

Sun, Kun, et al. "SecureSwitch: BIOS-Assisted Isolation and Switch between Trusted and Untrusted Commodity OSes." George Mason Feb. 26, 2013, 15 pages.

Wojtczuk, Rafal. "Subverting the Xen hypervisor." Black Hat USA 2008 (2008), 9 pages.

Yan, Lok Kwong, et al. "Transparent and Extensible Malware Analysis by Combining Hardware Virtualization and Software Emulation." Internet Society, 2010. Downloaded from https://www.internersociety.org/sites/default/files/05_1.pdf, 1 page.

\* cited by examiner

MALWARE DETECTION APPLIANCE ARCHITECTURE

RELATED APPLICATION

The present application claims priority from commonly owned Provisional Patent Application No. 62/097,499, entitled Microvisor-Based Malware Detection Appliance Architecture, filed on Dec. 29, 2014, the contents of which are incorporated herein by reference.

BACKGROUND

Technical Field

The present disclosure relates to malware detection and, more specifically, to a microvisor-based malware detection architecture.

Background Information

A virtual machine monitor (VMM) or hypervisor may be a hardware or software entity configured to create and run a software implementation of a computing platform or machine, i.e., a virtual machine. The hypervisor may be implemented as a type 1 VMM executing over native hardware of the computing platform, or a type 2 VMM executing within an operating system environment of the platform. The hypervisor may be further deployed in a virtualization system that fully simulates (virtualizes) physical (hardware) resources of the computing platform. Such a full virtualization system may support execution of a plurality of operating system instances inside a plurality of virtual machines, wherein the operating system instances share the hardware resources of the platform. The hypervisor of the full virtualization system may manage such sharing by hiding the hardware resources of the computing platform from users (e.g., application programs) executing on each operating system instance and, instead, providing an abstract, virtual computing platform.

A prior implementation of a virtualization system includes a special virtual machine and a hypervisor that creates other virtual machines, each of which executes an independent instance of an operating system. Malicious code may be prevented from compromising resources of the system through the use of policy enforcement and containment analysis that isolates execution of the code within a virtual machine to block or inhibit its execution within the system (i.e., outside of the virtual machine). The policy enforcement and containment may be directed to active (often computationally intensive) analysis of operating system data streams (typically operating system version and patch specific) to detect anomalous behavior. However, malicious code may attempt to evade detection by avoiding malicious behavior when executing in a virtual machine or the malicious code may attempt to exploit a vulnerability of the virtual machine itself. Therefore, such data stream analysis may be of limited use with respect to detection of malware that exploits vulnerabilities in processes or applications (or the virtual machine) executing on systems within a network environment. Accordingly, there is a need for an enhanced exploit and malware detection system that detects anomalous behavior of malware (e.g., exploits and other malicious code threats) and collects analytical information relating to such behavior.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
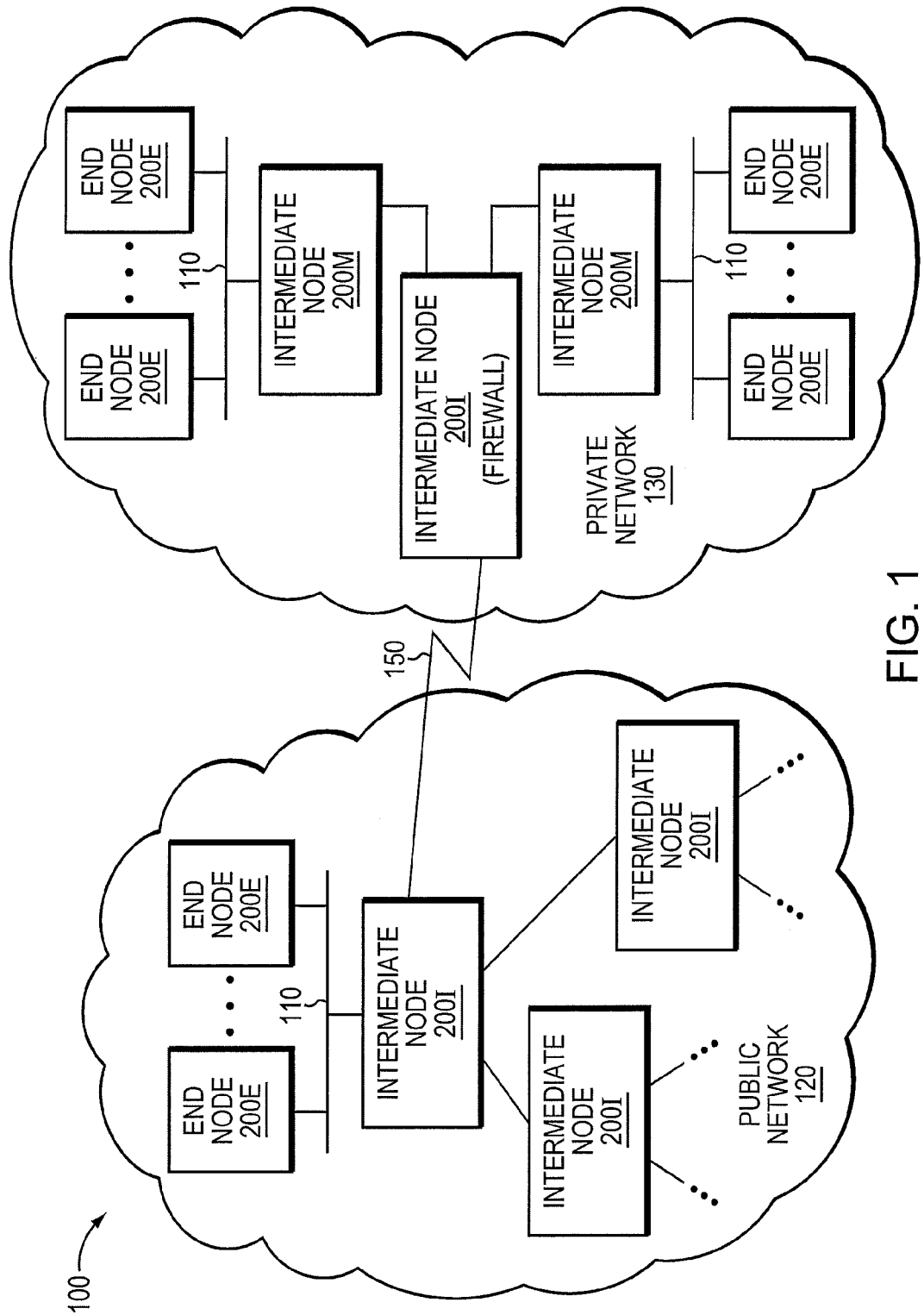
FIG. 1 is a block diagram of a network environment that may be advantageously used with one or more embodiments described herein.

The embodiments described herein provide a threat-aware microvisor deployed in a malware detection appliance architecture and executing on a malware detection system (MDS) appliance to provide exploit and malware detection within a network environment. The microvisor may underlie an operating system kernel of the MDS appliance and execute in kernel space of the architecture to control access to kernel resources of the appliance for any operating system process. A type 0 virtual machine monitor (VMM 0) may be disposed over the microvisor and operate in user space of the architecture as a pass-through module configured to expose the kernel resources of the appliance to the operating system kernel. One or more hypervisors, e.g., type 1 VMM (VMM 1), may be further disposed over the microvisor and operate in user space of the architecture under control of the microvisor to support execution of one or more guest operating systems inside one or more full virtual machines (VMs).

Exploit and malware detection on the MDS appliance may be performed in accordance with one or more software modules or engines configured to detect suspicious and/or malicious behaviors of an operating system process when, e.g., executing an object, and to correlate and classify the detected behaviors as indicative of malware. Detection of a suspicious and/or malicious object may be performed in accordance with a sequential two-phase approach, e.g., static analysis followed by dynamic analysis, of the object. Static analysis may perform examination of the object to determine whether it is suspicious and, if so, the suspicious object may be subjected to dynamic analysis, which may instrument the behavior of the object as it runs in a guest operating system. A behavioral analysis logic engine (BALE) and a classifier may thereafter cooperate to perform correlation and classification of the detected behaviors.

In an embodiment, the static analysis phase may include a static analysis engine having a heuristics engine executing as one or more user mode processes of the operating system kernel. The heuristics engine may run one or more heuristics to provide (heuristic) analysis using, e.g., rules or weighting methods to determine whether the object is suspicious. In response to a suspicious determination (or, in some embodiments, even during static analysis itself), the static analysis engine may analyze the object to, inter alia, identify software profile information associated with the guest operating system for execution in a VM, e.g., VM 1. The static analysis engine may then provide the software profile information to another user mode process embodied as a scheduler, which may coordinate with VMM 1 to spawn and schedule the VM 1 to analyze the object in accordance with the dynamic analysis phase. Dynamic analysis may include exploit and malware detection performed by the microvisor, VMM 1 and VM 1 to detect behaviors of the object. Illustratively, VMM 1 may configure VM 1 with a software profile that replicates a run-time environment that the object expects and, in some embodiments, a run-time environment of a real destination device. The behaviors of the object may be detected by instrumenting (i.e., monitoring) the object using, e.g., instrumentation logic, as the object executes in the guest operating system at VM 1, wherein the monitored run-time behaviors may be captured as dynamic analysis results by the microvisor and VMM 1.

The dynamic analysis results may be provided to the BALE, which may provide correlation information to the classifier. The BALE may be embodied as a rules-based correlation engine illustratively executing as an isolated process disposed over the microvisor. The BALE may be configured to operate on correlation rules that define, among other things, patterns (such as, e.g., sequences) of known malicious behaviors that may collectively correlate to malicious events (activity) and, in some embodiments, also patterns of known benign behaviors that may collectively correlate to benign (non-malicious) events. The dynamic analysis may collect the monitored behaviors and cooperate with the BALE to examine those behaviors, separately or collectively, as patterns to determine whether they represent malicious or benign events indicative of the presence of malware. For example, a behavior may be detected that appears benign, but when examined with other behaviors, may be indicative of malicious activity.

In an embodiment, the rules of the BALE may be correlated against the dynamic analysis results to generate correlation information pertaining to, e.g., a level of risk or a numerical score used to arrive at a decision of maliciousness. The classifier may be embodied as a classification engine executing as a user mode process of the operating system kernel and configured to use the correlation information provided by BALE to render a decision as to whether the object is malicious. Illustratively, the classifier may be configured to classify the correlation information, including monitored behaviors (expected and unexpected/anomalous) and capability violations, of the object relative to those of known malware and benign content.

In some embodiments, the MDS may be configured to perform only dynamic analysis, whose results may be provided to the BALE, which may provide correlation information to the classifier. Accordingly, in such embodiments, the initial static analysis of the objects as described herein may be avoided or significantly reduced (for example, to only identify suitable software profiles to process the objects). For example, suspicious or malicious objects (or simply "selected" objects) may be provided directly for dynamic analysis, as might be the case where additional forensic behavioral analyses of the suspicious or malicious objects are desired.

In an embodiment, the microvisor may be stored in a memory of the MDS appliance as a module of a trusted computing base (TCB) that also includes a root task module configured to cooperate with the microvisor to load one or more other modules executing on the MDS appliance. In addition, one or more of the malware detection system engines (modules) may be included in the TCB to provide a trusted malware detection environment. Illustratively, it may be desirable to organize modules associated with a decision of malware to be part of the TCB. For example, the BALE and/or classifier may be included in the TCB for the MDS appliance.

DESCRIPTION

FIG. 1 is a block diagram of a network environment 100 that may be advantageously used with one or more embodiments described herein. The network environment 100 illustratively includes a plurality of computer networks organized as a public network 120, such as the Internet, and a private network 130, such an organization or enterprise (e.g., customer) network. The networks 120, 130 illustratively include a plurality of network links and segments connected to a plurality of nodes 200. The network links and segments may include local area networks (LANs) 110 and wide area networks (WANs) 150, including wireless networks, interconnected by intermediate nodes $200_I$ to form an internetwork of nodes, wherein the intermediate nodes $200_I$ may include network switches, routers and/or one or more malware detection system (MDS) appliances (intermediate node $200_M$). As used herein, an appliance may be embodied as any type of general-purpose or special-purpose computer, including a dedicated computing device, adapted to implement a variety of software architectures relating to exploit and malware detection functionality. The term "appliance" should therefore be taken broadly to include such arrangements, in addition to any systems or subsystems configured to perform a management function for exploit and malware detection, and associated with other equipment or systems, such as a network computing device interconnecting the WANs and LANs. The LANs 110 may, in turn, interconnect end nodes $200_E$ which, in the case of private network 130, may be illustratively embodied as endpoints.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent, general-purpose or special-purpose electronic device having network connectivity and, particularly for some embodiments, that may be configured to implement a virtualization system. The nodes 200 illustratively communicate by exchanging packets or messages (i.e., network traffic) according to a predefined set of protocols, such as the Transmission Control Protocol/Internet Protocol (TCP/IP); however, it should be noted that other protocols, such as the HyperText Transfer Protocol Secure (HTTPS), may be advantageously used with the embodiments herein. In the case of private network 130, the intermediate node $200_I$ may include a firewall or other network device configured to limit or block certain network traffic in an attempt to protect the endpoints from unauthorized users. Unfortunately, such conventional attempts often fail to protect the endpoints, which may be compromised.

Figure 2:
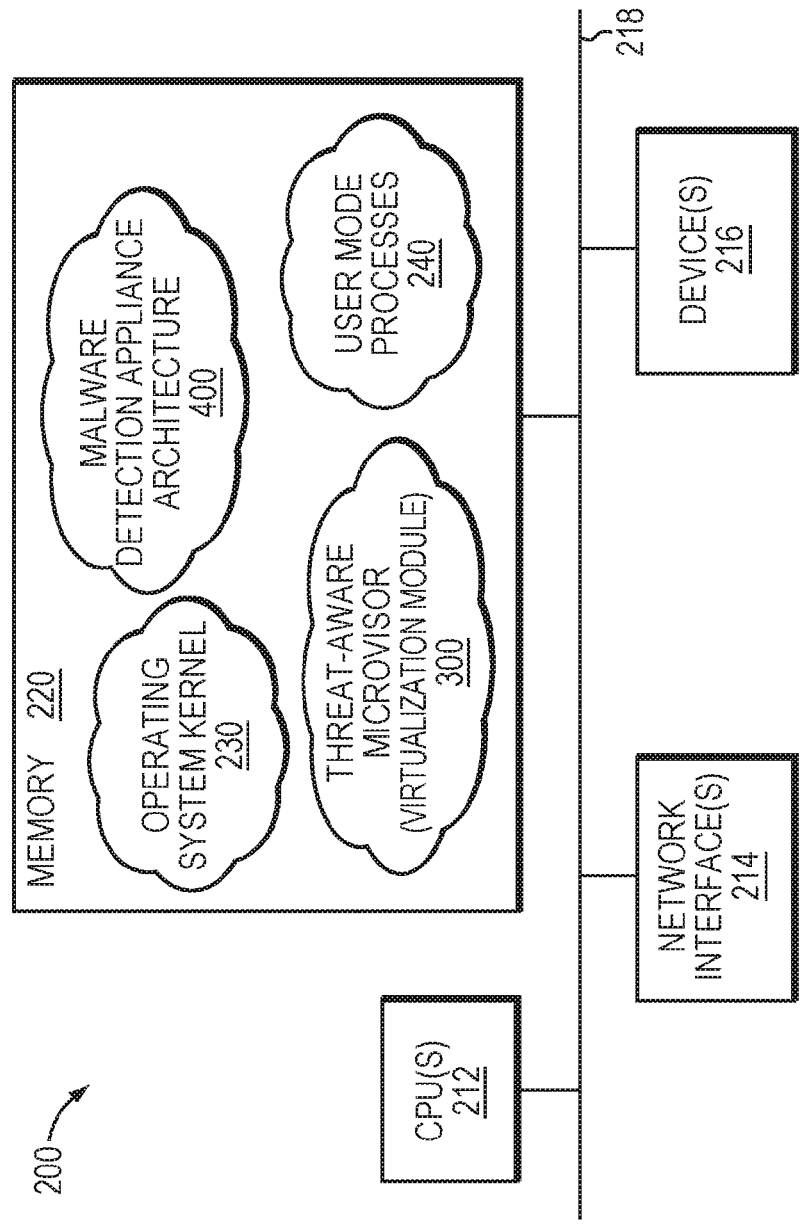
FIG. 2 is a block diagram of a node that may be advantageously used with one or more embodiments described herein.

FIG. 2 is a block diagram of a node 200, e.g., MDS appliance node $200_M$, that may be advantageously used with one or more embodiments described herein. The node 200 illustratively includes one or more central processing unit (CPUs) 212, a memory 220, one or more network interfaces 214 and one or more devices 216 connected by a system interconnect 218, such as a bus. The devices 216 may include various input/output (I/O) or peripheral devices, such as storage devices, e.g., disks. The disks may be solid state drives (SSDs) embodied as flash storage devices or other non-volatile, solid-state electronic devices (e.g., drives based on storage class memory components), although, in an embodiment, the disks may also be hard disk drives (HDDs). Each network interface 214 may include one or more network ports containing the mechanical, electrical and/or signaling circuitry needed to connect the node to the network 130 to thereby facilitate communication over the network. To that end, the network interface 214 may be configured to transmit and/or receive messages using a variety of communication protocols including, inter alia, TCP/IP and HTTPS.

In one or more embodiments where the MDS appliance $200_M$ is communicatively coupled with the network 130, the network interface 214 may operate as a data capturing device (sometimes referred to as a "tap" or "network tap") that is configured to receive incoming network (data) traffic propagating from public network 120 and into private network 130, and provide at least some of this data traffic or a duplicated copy of the traffic for malware detection. In one embodiment, the MDS appliance may be positioned (deployed) behind the firewall at an ingress point into the private network 130, and at least partially in-line with network devices (e.g., endpoints) so as to subject the incoming traffic to analysis (e.g., through static analysis) and potentially block that traffic which is classified as malware from reaching its destination (e.g., the endpoints). In another embodiment, the static analysis may be at least partially performed by the firewall or other intermediate device, or performed by the network interface 214 (e.g., by CPU 212 and/or a digital signal processor on a network interface card).

The memory 220 may include a plurality of locations that are addressable by the CPU(s) 212 and the network interface(s) 214 for storing software program code (including application programs) and data structures associated with the embodiments described herein. The CPU 212 may include processing elements or logic adapted to execute the software program code, such as threat-aware microvisor 300 and modules of malware detection appliance architecture 400, and manipulate the data structures. Exemplary CPUs may include families of instruction set architectures based on the x86 CPU from Intel Corporation of Santa Clara, Calif. and the x64 CPU from Advanced Micro Devices of Sunnyvale, Calif.

An operating system kernel 230, portions of which are typically resident in memory 220 and executed by the CPU, functionally organizes the node by, inter alia, invoking operations in support of the software program code and application programs executing on the node. A suitable operating system kernel 230 may include the Windows® series of operating systems from Microsoft Corp of Redmond, Wash., the MAC OS® and IOS® series of operating systems from Apple Inc. of Cupertino, Calif., the Linux operating system and versions of the Android™ operating system from Google, Inc. of Mountain View, Calif., among others. Suitable application programs may include Adobe Reader® from Adobe Systems Inc. of San Jose, Calif. and Microsoft Word from Microsoft Corp of Redmond, Wash. Illustratively, the software program code may be implemented as user mode processes 240 of the kernel 230. As used herein, a process (e.g., a user mode process) is an instance of software program code (e.g., an application program) executing in the operating system that may be separated (decomposed) into one or more threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code, processes, and computer, e.g., application, programs stored in memory, alternative embodiments also include the code, processes and programs being embodied as engines and/or modules consisting of hardware, software, firmware, or combinations thereof.

Threat-Aware Microvisor

Figure 3:
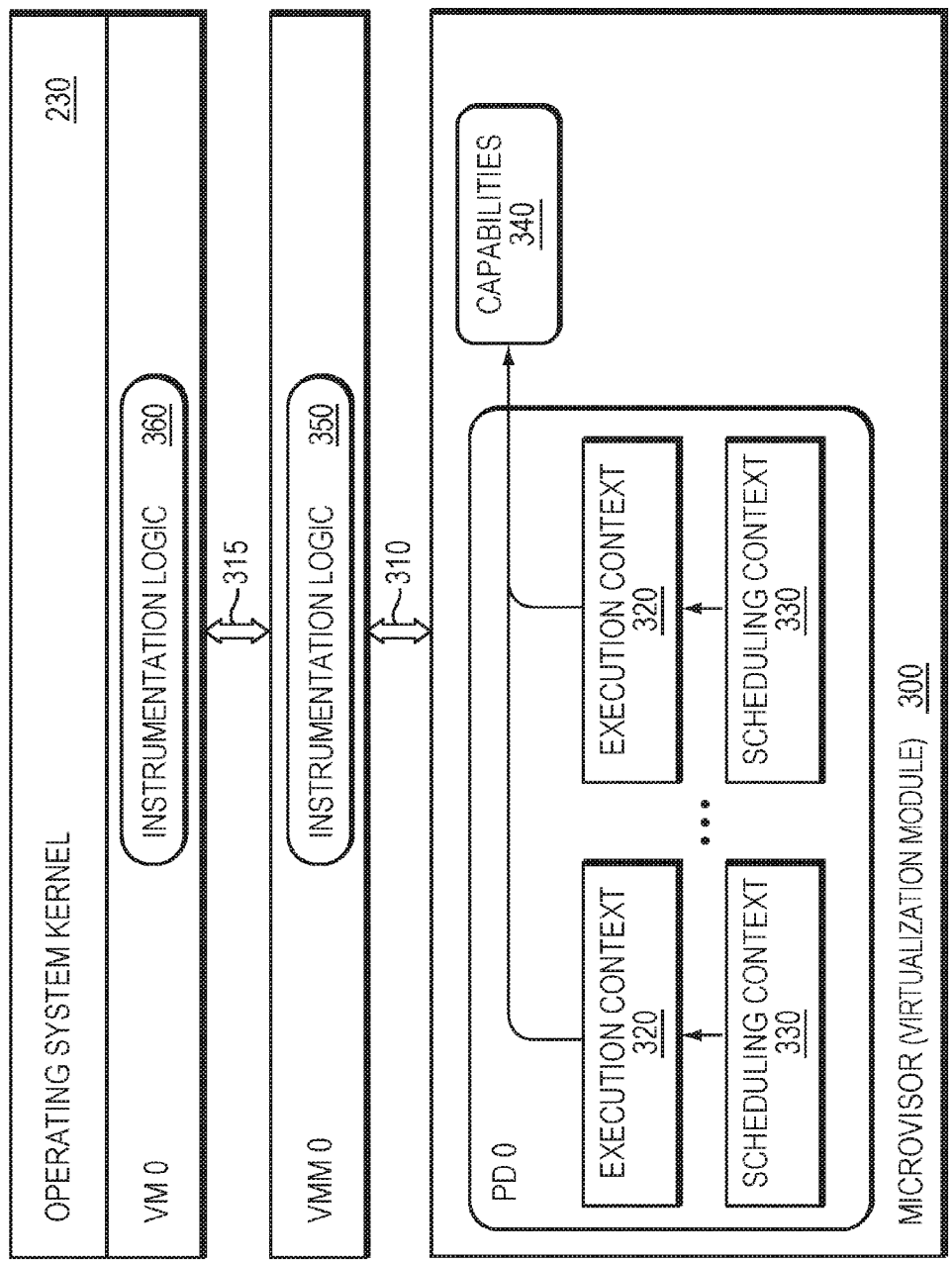
FIG. 3 is a block diagram of the threat-aware microvisor that may be advantageously used with one or more embodiments described herein.

FIG. 3 is a block diagram of the threat-aware microvisor 300 that may be advantageously used with one or more embodiments described herein. The threat-aware microvisor (hereinafter "microvisor") may be configured to facilitate run-time security analysis, including exploit and malware detection and threat intelligence, of operating system processes executing on the node 200. To that end, the microvisor may be embodied as a light-weight module disposed or layered beneath (underlying, i.e., directly on native hardware) the operating system kernel 230 of the node to thereby virtualize the hardware and control privileges (i.e., access control permissions) to kernel (e.g., hardware) resources of the node 200 that are typically controlled by the operating system kernel. Illustratively, the kernel resources may include (physical) CPU(s) 212, memory 220, network interface(s) 214, and devices 216. The microvisor 300 may be configured to control access to one or more of the resources in response to a request by an operating system process to access the resource.

As a light-weight module, the microvisor 300 may provide a virtualization layer having less functionality than a typical hypervisor. Therefore, as used herein, the microvisor 300 is a module (component) that underlies the operating system kernel 230 and includes the functionality of a microkernel (e.g., protection domains, execution contexts, capabilities and scheduling), as well as a subset of the functionality of a hypervisor (e.g., hyper-calls to implement a virtual machine monitor). Accordingly, the microvisor may cooperate with a unique virtual machine monitor (VMM), i.e., a type 0 VMM, to provide additional virtualization functionality in an operationally and resource efficient manner. Unlike a type 1 or type 2 VMM (hypervisor), the type 0 VMM (VMM 0) does not fully virtualize the kernel (hardware) resources of the node and supports execution of only one entire operating system/instance inside one virtual machine, i.e., VM 0. VMM 0 may thus instantiate VM 0 as a container for the operating system kernel 230 and its kernel resources. In an embodiment, VMM 0 may instantiate VM 0 as a module having instrumentation logic 360 directed to determination of an exploit or malware in any suspicious operating system process (kernel or user mode).

As used herein, an exploit may be construed as information (e.g., executable code, data, one or more commands provided by a user or attacker) that attempts to take advantage of a computer program or system vulnerability, often employing or constituting malware. Typically, a vulnerability may be a coding error or artifact of a computer program that allows an attacker to alter legitimate control flow during processing of the computer program by an electronic device and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed as computer code that is executed to harm or co-opt operation of an electronic device or misappropriate, modify or delete data. Conventionally, malware may often be designed with malicious intent, and may be used to facilitate an exploit. For convenience, the term "malware" may be used herein to describe a malicious attack, and encompass both malicious code and exploits detectable in accordance with the disclosure herein.

Illustratively, VMM 0 is a pass-through module configured to expose the kernel resources of the node (as controlled by microvisor 300) to the operating system kernel 230. VMM 0 may also expose resources such as virtual CPUs (threads), wherein there is one-to-one mapping between the number of physical CPUs and the number of virtual CPUs that VMM 0 exposes to the operating system kernel 230. To that end, VMM 0 may enable communication between the operating system kernel (i.e., VM 0) and the microvisor over privileged interfaces 315 and 310. The VMM 0 may include software program code (e.g., executable machine code) in the form of instrumentation logic 350 (including decision logic) configured to analyze one or more interception points originated by one or more operating system processes to invoke the services, e.g., accesses to the kernel resources, of the operating system kernel 230. As used herein, an interception point is a point in an instruction stream where control passes to (e.g., is intercepted by) either the microvisor, VMM 0 or another virtual machine. A system call provides an interception point at which a switch in privilege levels occurs in the operating system, i.e., from a privilege level of the user mode process to a privilege level of the operating system kernel. VMM 0 may intercept the system call and examine a state of the process issuing (sending) the call to determine whether the call is suspicious. Illustratively, VMM 0 may contain computer executable instructions executed by the CPU 212 to perform operations that initialize and implement the instrumentation logic 350, as well as operations that spawn, configure, and control/implement VM 0 and its instrumentation logic 360. Example threat-aware microvisor and VMM 0 are described in U.S. Pat. No. 9,507,935, issued Nov. 29, 2016, titled Exploit Detection System with Threat-Aware Microvisor by Ismael et al., filed Mar. 28, 2014, which application is hereby incorporated by reference.

In an embodiment, the microvisor 300 may be organized to include a protection domain illustratively bound to VM 0. As used herein, a protection domain is a container for various data structures, such as execution contexts, scheduling contexts, and capabilities associated with the kernel resources accessible by an operating system process. Illustratively, the protection domain may function at a granularity of an operating system process (e.g., a user mode process 240) and, thus, is a representation of the process. Accordingly, the microvisor may provide a protection domain for the process and its run-time threads executing in the operating system. A main protection domain (PD 0) of the microvisor controls all of the kernel resources available to the operating system kernel 230 (and, hence, the user mode process 240) of VM 0 via VMM 0 and, to that end, may be associated with the services provided to the user mode process by the kernel 230.

An execution context 320 is illustratively a representation of a thread (associated with an operating system process) and, to that end, defines a state of the thread for execution on CPU 212. In an embodiment, the execution context may include inter alia (i) contents of CPU registers, (ii) pointers/values on a stack, (iii) a program counter, and/or (iv) allocation of memory via, e.g., memory pages. The execution context 320 is thus a static view of the state of thread and, therefore, its associated process. Accordingly, the thread executes within the protection domain associated with the operating system process of which the thread is a part. For the thread to execute on a CPU 212 (e.g., as a virtual CPU), its execution context 320 is tightly linked to a scheduling context 330, which may be configured to provide information for scheduling the execution context 320 for execution on the CPU 212. Illustratively, the scheduling context information may include a priority and a quantum time for execution of its linked execution context on CPU 212.

In an embodiment, the capabilities 340 may be organized as a set of access control permissions to the kernel resources to which the thread may request access. Each time the execution context 320 of a thread requests access to a kernel resource, the capabilities 340 are examined. There is illustratively one set of capabilities 340 for each protection domain, such that access to kernel resources by each execution context 320 (i.e., each thread of an execution context) of a protection domain may be defined by the set of capabilities 340. For example, physical addresses of pages of memory 220 (resulting from mappings of virtual addresses to physical addresses) may have associated access permissions (e.g., read, write, read-write) within the protection domain. To enable an execution context 320 to access a kernel resource, such as a memory page, the physical address of the page may have an associated capability 340 (access permission) that defines how the execution context 320 may reference that page. Illustratively, the capabilities may be examined by hardware (e.g., a hardware page fault upon a memory access violation) or by program code. A violation of a capability in a protection domain may be an interception point, which returns control to the VM (e.g., VM 0) bound to the protection domain.

Assume a user mode process 240 has one or more threads that run on one or more CPUs 212. Each thread has an associated execution context 320 that defines its state. When executing on a CPU 212, the thread may attempt to access a resource (a memory page). VMM 0 may instruct the microvisor 300 to configure the access permission to the memory page according to a definition of the capability within the protection domain bound to the process executing the thread. Assume further that the capability specifies that a protection domain (e.g., PD 0) can have only read-only access to the memory page. If the CPU 212 attempts to write to that memory, i.e., a write access, a trap (e.g., an exception, such as a page fault or general protection fault) may be generated by the CPU and the microvisor 300 may report the trap (via an exception handler) to VMM 0. VMM 0 may decide that such write access should be allowed and instructs the microvisor to allow the access. Alternatively, VMM 0 may decide that such write access warrants further analysis using a different set of capabilities to further monitor the process 240.

In an embodiment, the different set of capabilities may pertain to certain kernel resources, such as memory regions (as opposed to memory pages of the regions). Here, the capabilities may not be configured to define access permissions at the granularity of memory pages (e.g., 4K bytes) because of the substantial memory resources (i.e., page table entries) needed to accommodate sufficient pages to cover large memory regions. As such, in an embodiment, a region of memory (i.e., having a plurality of memory pages) may be associated with certain permissions (read-only, write-only) as defined by the capabilities, wherein the memory region may be "fine-grained" (e.g., enlarged or shrunk) to enable read or write only permissions to memory pages within the region. Accordingly, the capabilities may provide one or more variable granularity memory regions for each protection domain, wherein a least granularity is a memory page (e.g., 4 Kbytes).

In an embodiment, the microvisor 300 may be configured to perform scheduling of execution contexts 320 and verification of operational requests by the execution contexts with respect to capabilities 340. If there is a violation of the capabilities for a protection domain, a trap (e.g., an exception, such as a page fault or general protection fault) may be generated by the CPU (or other hardware) and serviced by an exception handler of the microvisor. For example, if a process 240 attempts to access a resource to which the capability specifies it does not have permission, the CPU may generate the trap and the exception handler may report the violation to, e.g., VMM 0 for analysis. In addition, the microvisor may provide VMM 0 with state information associated with the execution context 320 executing at the time of the trap. The capability violation may trigger invocation of the instrumentation logic 350 of VMM 0 to determine whether the process is suspicious or even an exploit and, if so, an appropriate course of action. Depending on the seriousness of the violation (e.g., a degree of suspicion of an exploit), VMM 0 may decide to, e.g., change a register value or issue a capability change. VMM 0 may then provide instructions to the microvisor (PD 0) as to a course of action.

For instance, assume the capability violation arises from an attempt by the process 240 to execute program instructions on a memory page not permitted to execute such instructions (e.g., a page table entry associated with the memory page configured with a no-execute bit). As a result, a page fault exception may occur that triggers invocation of the instrumentation logic 350, which may apply heuristics to determine whether the memory page likely contains an exploit as opposed to benign program instructions, e.g., just-in-time (JIT) compiler program instructions. That is, the instrumentation logic may apply the heuristics to rule out (eliminate) the likelihood that the capability violation (i.e., page fault exception) is caused by benign program instructions. Illustratively, the heuristics perform static analysis of the memory page to determine whether the capability violation is consistent with JIT compiler generated program instructions. To that end, the heuristics may determine whether the memory page is allocated by the process 240 and whether the contents of the memory page contain well-known program instruction sequences and headers, e.g., industry standard prefix and postfix generated instruction sequences and vendor identifying headers. In contrast, exploits (i.e., malware) may contain non-standard program instruction sequences and unusual headers. As a result, the heuristics may determine that a threshold of confidence (i.e., suspicion of an exploit) is exceeded when it is statistically likely the memory page contains an exploit.

In another instance, the instrumentation logic 350 may apply the heuristics to detect a sequence of capability violations that indicates the presence of an exploit (or malware). Assume a first capability violation arises from an attempt by the process 240 to write program instructions on a memory (code) page without write permission (e.g., a page table entry associated with the memory page configured with a read-only bit or no write bit and an execute bit). Assume also that a second capability violation arises from an attempt by the process to execute those program instructions on the code page. In response to the first capability violation, a first page fault exception occurs that triggers invocation of the instrumentation logic 350, which may apply heuristics that note (i.e., record) the attempted write to the code page. In response to the second capability violation, a second page fault exception may occur that again triggers invocation of the instrumentation logic, which applies the heuristics that recall the attempt to write instructions to the code page (i.e., a same memory page that led to the first page fault exception) in response to the first capability violation. Accordingly, the heuristics may determine that an attempt to "execute after write" (i.e., an attempt to execute program instructions from a memory page that was previously written) has occurred, which may indicate a likelihood of presence of an exploit (or malware). That is, the instrumentation logic may apply the heuristics to detect an execute-after-write arising from two or more capability violations that indicates the likelihood of presence of an exploit (or malware), e.g., the threshold of confidence is exceeded. As such, a pattern (e.g., sequence) of capability violations may be used to determine whether the threshold of confidence (i.e., suspicion of an exploit) is exceeded indicating the statistical likelihood that the process contains an exploit (or malware).

Malware Detection Appliance Architecture

In one or more embodiments, the MDS appliance node (MDS) $200_M$ may be embodied as an intermediate node configured to analyze network traffic associated with one or more endpoints $200_E$ of a computer network, such as private network 130. The MDS $200_M$ may be illustratively positioned (e.g., as an ingress/egress point) within the private network 130 to intercept (i.e., snoop) the traffic. The intercepted traffic may be replayed (i.e., transmitted) to or its contents otherwise submitted to and, in any case, instrumented (i.e., monitored) at the MDS $200_M$.

Illustratively, the MDS appliance $200_M$ may include functionality directed to replaying of network traffic and using instrumentation of that traffic to monitor the processing of objects within the traffic. For every network packet received, the MDS appliance may run a heuristic to compute a flow, as appropriate, for the packet, and then create (spawn) a virtual machine (VM) to emulate the endpoint using an image of an operating system (guest operating system and, often, one or more applications) configured to replicate a software processing environment of the endpoint, e.g., based on a payload (object) of the packet to be replayed and instrumented. An object may include a logical entity such as, for example, a web page, an email or email attachment, an executable (i.e., binary or script), a file (which may contain an executable), or universal resource locator (URL). Information as to an appropriate processing environment may be provided by the packet itself, e.g., the packet header may identify the packet type, for example, a document such as a Portable Document Format (PDF) document and, thus, the processing environment may include a document reader, such as a PDF reader from Adobe Systems Inc. Additionally, or in alternative embodiments, information may also be provided by the endpoint (such as the destination endpoint as specified in the packet) to the MDS indicating a type of application software (process) executing within the operating system on the endpoint. The MDS may then launch a copy of the application along with appropriate instrumentation to process each object. For example, assume the MDS replays HTTPS traffic received at the endpoint which executes, inter alia, an application (i.e., a web browser). The MDS may capture the network (HTTPS) traffic destined to the endpoint, spawn the VM and launch a copy of the web browser along with instrumentation to monitor the traffic.

Figure 4:
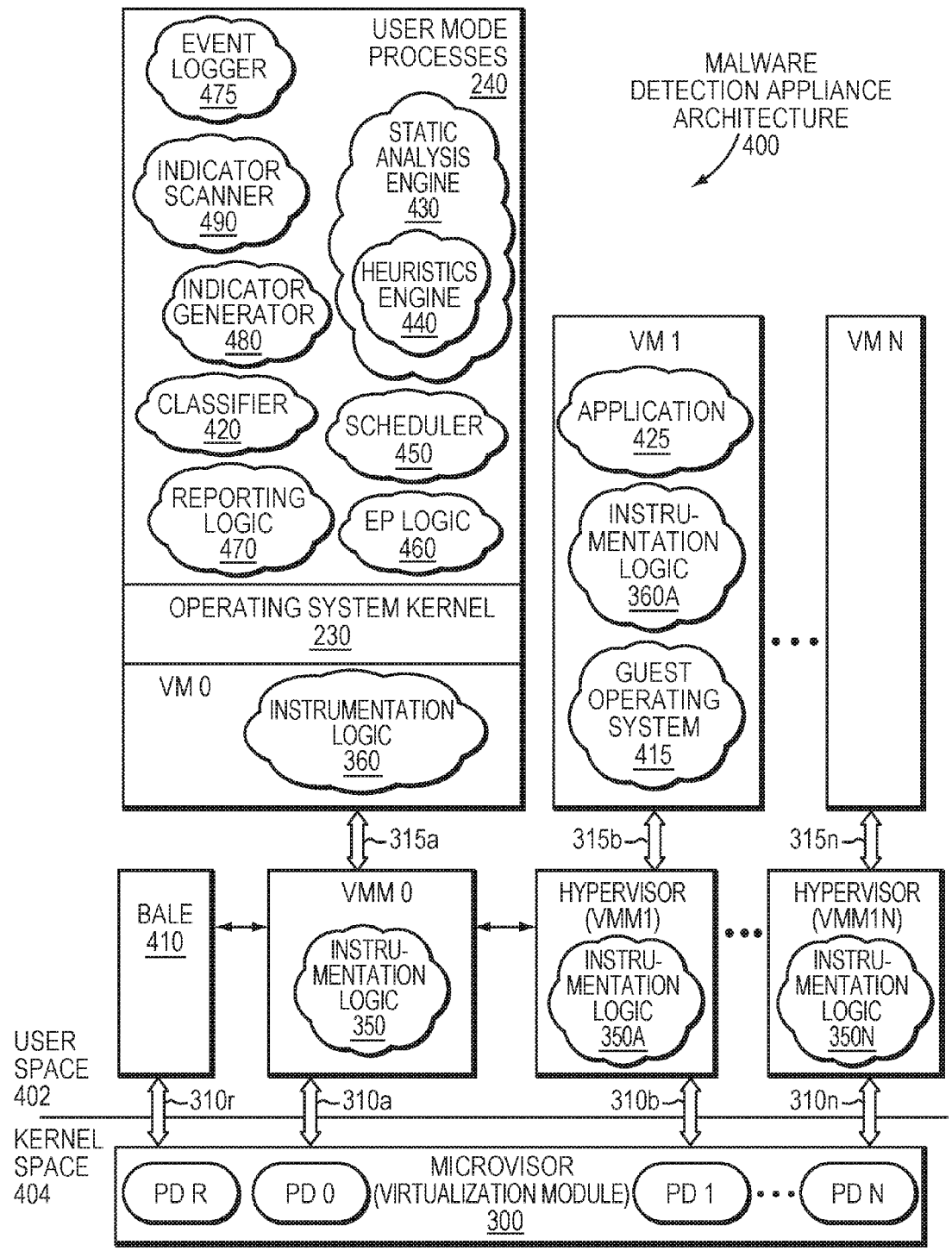
FIG. 4 is a block diagram of a malware detection appliance architecture that may be advantageously used with one or more embodiments described herein.

In an embodiment, the threat-aware microvisor 300 may be deployed in a virtualization architecture as a module of a virtualization system executing on the MDS $200_M$ to provide exploit and malware detection within the network environment 100. FIG. 4 is a block diagram of a malware detection appliance architecture 400 that may be advantageously used with one or more embodiments described herein. Illustratively, the architecture 400 may organize the memory 220 of the MDS appliance $200_M$ as a user space 402 and a kernel space 404. The microvisor may underlie the operating system kernel 230 and execute in the kernel space 404 of the architecture 400 to control access to the kernel resources of the MDS $200_M$ for any operating system process (kernel or user mode). Notably, the microvisor 300 executes at the highest privilege level of the hardware (CPU) to virtualize access to the kernel resources of the MDS appliance in a light-weight manner when, e.g., a user mode process 240 requests the services of the operating system kernel 230.

The user mode processes 240 and operating system kernel 230 may execute in the user space 402 of the appliance architecture 400, although it will be understood to those skilled in the art that the user mode processes may execute in another address space defined by the operating system kernel. Illustratively, the operating system kernel 230 may execute under control of the microvisor at a privilege level (i.e., a logical privilege level) lower than a highest privilege level of the microvisor, but at a higher CPU privilege level than that of the user mode processes 240. In addition, VMM 0 and VM 0 may execute in user space 402 of the architecture 400. As a type 0 virtual machine monitor, VMM 0 and VM 0 may execute at the highest (logical) privilege level of the microvisor. That is, VMM 0 and VM 0 may operate under control of the microvisor at the highest microvisor privilege level, but may not directly operate at the highest CPU (hardware) privilege level.

One or more hypervisors, e.g., type 1 VMM, may be disposed as one or more modules over the microvisor 300 and operate in user space 402 of the architecture 400 under control of the microvisor at the highest microvisor privilege level to provide additional layers of virtualization for the MDS $200_M$. Illustratively, each hypervisor provides full virtualization of kernel (hardware) resources and supports execution of one or more entire operating system instances (i.e., guest operating system) inside one or more full virtual machines. To that end, a hypervisor (e.g., VMM 1) may instantiate a full VM (e.g., VM 1) as a module provisioned with a software profile that includes a guest operating system (e.g., guest operating system 415) and any associated application programs (e.g., application 425), as well as instrumentation logic (e.g., instrumentation logic 360A) directed to determination of malware in any suspicious object or application running on the guest operating system. The software profile (e.g., guest operating system and/or application program) provisioned and configured in the VM may be different (e.g., in vendor, type and/or version) from the software profile provisioned and configured in other instantiated VMs (e.g., VM N).

Illustratively, each hypervisor (e.g., VMM $1\text{-}1_N$) may contain computer executable instructions executed by the CPU 212 to perform operations that initialize and configure the instrumentation logic (e.g., instrumentation logic 350A-N), as well as operations that spawn, configure, and control/implement the VM (e.g., VM 1-N) and its instrumentation logic (e.g., 360A). In an embodiment, there is illustratively one hypervisor (e.g., VMM $1\text{-}1_N$) for each VM (e.g., VMs 1-N), wherein each VM may be used to emulate an endpoint. The MDS $200_M$ may not emulate every endpoint on, e.g., a segment, but when a malicious object (such as, e.g., a file of a network packet) is identified, the VMM 1 of the MDS appliance may create (spawn) a full VM 1 to analyze that object. The virtualization layers of the MDS $200_M$ may cooperate to implement an abstraction of virtual devices exposed as, e.g., virtual network interfaces to the VMs.

Illustratively, the instrumentation logic 350 of VMM 0 may include monitoring logic configured to monitor and collect behaviors detected during processing of a suspicious object or application, wherein the behaviors may or may not constitute capability violations (e.g., generated by CPU 212 in response to one or more interception points). A system call illustratively provides an interception point at which a change in privilege levels occurs in the operating system, i.e., from a privilege level of the user mode process to a privilege level of the operating system kernel. VMM 0 may intercept the system call and examine a state of the process issuing (sending) the call. The instrumentation logic 350 of VMM 0 may analyze the system call to determine whether the call is suspicious and, if so, cooperate with VMM 1 to instantiate (spawn) one or more virtual machines (e.g., VM 1) equipped with monitoring functions, e.g., of instrumentation logic 360A, that cooperate with the microvisor to detect anomalous behavior which may be used in determining malware.

Inference of malware may also be realized through sequences of interception points wherein, for example, a system call followed by another system call having certain parameters may lead to an inference that the application (process) sending the calls is malware. The interception point thus provides an opportunity for VMM 0 to perform "light-weight" analysis to evaluate a state of the process in order to detect possible malware without requiring any policy enforcement. VMM 0 may then cooperate with VMM 1 to spawn a full VM 1 and configure the capabilities of its protection domain to enable deeper monitoring and analysis (e.g., through interception points and capability violations) that, in combination with malware detection processing, enable detection of expected (or unexpected) behaviors of the process that may be indicative of malware. Notably, the analysis may also classify the process as a type of exploit (e.g., a stack overflow) or as malware and may even identify the same. As a result, the invocation of instrumentation and monitoring logic of VMM 0, VMM 1 and their spawned VMs in response to interception points originated by operating system processes and capability violations generated by the microvisor advantageously enhance the virtualization system described herein to provide an exploit and malware detection system configured for run-time security analysis of the operating system processes executing on the MDS $200_M$.

In an embodiment, the privileged interfaces 310 and 315 may be embodied as a set of defined hyper-calls, which are illustratively inter process communication (IPC) messages exposed (available) to VMM 0, VMM $1\text{-}1_N$ (including spawned VMs) and any other isolated software program code (module). The hyper-calls are generally originated by VMM 0 and VMM $1\text{-}1_N$, directed to the microvisor 300 over privileged interface 310*a-n*, although VM 0 and VM 1-N may also originate one or more hyper-calls (IPC messages) directed to the microvisor over privileged interface 315*a-n*. However, the hyper-calls originated by VM 0 and VM 1-N may be more restricted than those originated by VMM 0 and VMM 1-1$_N$.

In an embodiment, the microvisor 300 may be organized to include a plurality of protection domains (e.g., PD 0-R) illustratively bound to VM 0, one or more VMs, and any isolated module, respectively. For example, the spawned VM (e.g., VM 1) is illustratively associated with (bound to) a copy of PD 0 (e.g., PD 1), wherein such binding may occur through memory context switching. In response to a decision to spawn the VM 1, VMM 1 may issue a hyper-call over interface 310*b* to the microvisor requesting creation of the protection domain PD 1. Upon receiving the hyper-call, the microvisor 300 may copy (i.e., "clone") the data structures (e.g., execution contexts, scheduling contexts and capabilities) of PD 0 to create PD 1 for the VM 1, wherein PD 1 has essentially the same structure as PD 0 except for the capabilities associated with the kernel resources. The capabilities for PD 1 may limit or restrict access to one or more of the kernel resources as instructed through one or more hyper-calls from, e.g., VMM 1 and/or VM 1 over interface 310*b* to the microvisor. Such cloning of the PD 0 data structures may also be performed to create other PDs, such as PD N for VM N as well as PD R for the isolated module disposed over the microvisor. Accordingly, the microvisor 300 may contain computer executable instructions executed by the CPU 212 to perform operations that initialize, clone and configure the protection domains.

Advantageously, the microvisor 300 may be organized as separate protection domain containers for the operating system kernel 230 (PD 0), one or more application programs/processes running in one or more operating system images (PD 1-N) and any isolated module (PD R) to facilitate further monitoring and/or understanding of behaviors of a process/object and its threads through, inter alia, the use of interception points and capability violations as described herein. Such organization of the microvisor also enforces separation between the protection domains to control the activity of the monitored process. Moreover, the microvisor 300 may enforce access to the kernel resources through the use of variously configured capabilities of the separate protection domains. Unlike previous virtualization systems, separation of the protection domains to control access to kernel resources at a process granularity enables detection of anomalous behavior of malware. That is, in addition to enforcing access to kernel resources, the microvisor enables analysis of the operation of a process/object within a spawned VM to detect exploits or other malicious code threats that may constitute malware.

Malware Detection

Exploit and malware detection on the appliance may be performed in accordance with one or more processes embodied as software modules or engines containing computer executable instructions executed by the CPU to detect suspicious and/or malicious behaviors of an operating system process (including an application program) when, e.g., executing contents of an object, and to correlate and classify the detected behaviors as indicative of malware (i.e., a matter of probability). It should be noted that the MDS appliance may perform (implement) exploit and malware detection as its primary processing (i.e., majority use of appliance resources) whereas, e.g., the endpoint may implement such detection as background processing (i.e., minor use of endpoint resources) with data processing being implemented as its primary processing (e.g., in the foreground having majority use of endpoint resources).

Detection of a suspicious and/or malicious object may be performed at the appliance in accordance with a sequential two-phase analysis approach, e.g., static analysis followed by dynamic analysis, of the object. As noted, an object may include a web page, email, email attachment, an executable (i.e., binary or script), a file (which may contain an executable or document), or a URL. Static analysis may perform examination of the object to determine whether it is suspicious and, if so, the suspicious object may be subjected to dynamic analysis, which may instrument the behavior of the object as it executes (runs) in guest operating system 415 to identify anomalous behavior and capability violations of, e.g. operating system events. A behavioral analysis logic engine (BALE) 410 and a classifier 420 may thereafter cooperate to perform correlation and classification of the detected behaviors as malicious or not. That is, the BALE 410 and classifier 420 may cooperate to analyze and classify detected behaviors of the object (based on the events) as indicative of malware.

Illustratively, static analysis may be provided as a precursor to dynamic analysis (i.e., a sequential two-phase approach) such that the static analysis phase may filter objects so that only suspect objects are provided to the dynamic analysis phase and/or may determine the order of processing (priority) of objects during the dynamic analysis, depending on the embodiment. In an embodiment, the static analysis phase may include a static analysis engine 430 having a heuristics engine 440 executing as one or more user mode processes of the operating system kernel 230. The static analysis engine 430 and heuristics engine 440 may employ statistical analysis techniques, including the use of heuristics, to perform non-behavioral analysis in order to detect anomalous characteristics (i.e., suspiciousness and/or malware) without execution (i.e., monitoring run-time behavior) of the object. For example, the static analysis engine 430 may employ signatures (referred to as malware "indicators") to match content (e.g., bit patterns) of the object with patterns of known indicators of known malware in order to gather information that may indicate that the object is suspicious or malicious. The statistical analysis techniques may produce static analysis results that include, e.g., identification of communication protocol anomalies and/or suspect source addresses for packets of known malicious servers.

As used herein, static analysis (e.g., as performed by the static analysis engine 430) denotes examination or testing of content of an object and observation of patterns within the content (e.g., bit patterns) to generate a score based on the results. The score may be a probability value (expressed in any of various ways such as, for example, a numerical value or percent) or other indicator (quantitative or qualitative) of security risk. A software program may be employed to examine chunks of bytes within an object (file) and compare those chunks with entries of a suspicious object database having chunks of objects deemed suspicious or malicious. If the chunks match, the score may be generally indicative of suspiciousness of the object. Static analysis may further involve comparison of the object's content (e.g., bit patterns) with a "blacklist" of suspicious malware indicator patterns before any behavioral analysis is performed. For example, a simple indicator check (e.g., hash) against the hashes of the blacklist (i.e., malware indicators of objects deemed suspicious) may reveal a match and a score may be generated (based on the content) that may be generally indicative of suspiciousness of the object.

An object with an associated score (value) above a first threshold may indicate a suspicious object, i.e., an object with a certain probability of being malicious, and above a second, higher threshold may indicate that object should be classified as malware, i.e., an object with a high probability of being malicious. The MDS may classify the object as malware in response to the score, and may or may not bypass the dynamic analysis as a result. If the MDS classifies the object as malicious based on a static analysis results score, this may be signaled to a network or security administrator for action by an appropriate alert. Additionally, the malicious object may be submitted for dynamic analysis for acquisition of additional, forensic information.

In an embodiment, the heuristics engine 440 may be configured to apply rules and/or policies used to detect anomalous characteristics of the object, such as one or more packets of network traffic, and to identify whether the object is suspect and deserving of further analysis or whether it is non-suspect (i.e., benign) and not in need of further analysis. To that end, the heuristic engine 440 may run one or more heuristics to provide (heuristic) analysis using, e.g., rules or weighting methods to determine whether the object (packet) is suspicious. In response to a suspicious determination or during static analysis (depending on the embodiment), the static analysis engine 430 may analyze the object, e.g., an attached or embedded object (e.g., a file) of one or more packets of the suspicious traffic, to, inter alia, determine its type and identify software profile information associated with an operating system instance (i.e., guest operating system 415) of a run-time environment for execution in a VM. The static analysis engine 430 may then provide the software profile information to another user mode process embodied as scheduler 450, which may coordinate with VMM 1 (e.g., via VMM 0) to spawn and schedule VM (e.g., VM 1) to replay the traffic (and analyze the object) in accordance with the dynamic analysis stage.

In an embodiment, the scheduler 450 is responsible for scheduling dynamic analysis of objects following static analysis. The scheduler may schedule the objects in accordance with an order (i.e., priority) based on the static analysis score for the objects. Where the static analysis engine 430 determines a score above a prescribed threshold indicating a high probability the corresponding object is malicious, the object may be scheduled for dynamic analysis ahead of other objects associated with lower static analysis scores even if those other objects were received earlier than the object in question. Where the object is determined to be part of a flow (namely a group of related messages) that is part of ingress data traffic typically communicated between two electronic devices during a single communication session (e.g., Transport Control Protocol "TCP" session), the scheduler 450 may schedule the dynamic analysis after receipt (i.e., buffering) of the entire flow.

In one or more embodiments, the static analysis engine 430 may be configured to analyze content of the packet (e.g., source and/or destination address of a network header) to determine its source and/or destination (i.e., web site and/or endpoint). The static analysis engine 430 may then cooperate with another module, e.g., endpoint (EP) logic 460, executing as a user mode process of the operating system kernel 230 and configured to communicate with a corresponding endpoint $200_E$. In an embodiment, the MDS appliance may be configured to communicate with and instruct the endpoint to, e.g., perform an action and receive notification of that action. For example, the MDS appliance may communicate with the endpoint to obtain the latest software being run at the endpoint, or to access a database of all software images maintained on a per endpoint basis. The MDS may then configure the run-time environment for dynamic analysis on instantiation of the VM with the same operating system and at least one of the same applications, or a "nearly similar" operating system and application that is available to the appliance, e.g., stored in the appliance. If the same operating system and applications, e.g., in terms of vendor, type and version, are employed, then malware detection may find malware (e.g., contained in the object) including exploits that attack vulnerabilities in the software.

In other embodiments, communication with a corresponding endpoint can be avoided while still practicing other aspects of the disclosure. In such embodiments, the software profile used to configure the VM may simply be an available profile suitable to process the object. For example, where the object is determined to be a Microsoft WORD® document, the VM may be provisioned with a version of that software, and where the object is an executable, a process (e.g., script) may be used to launch the executable within the virtual run-time environment.

Dynamic analysis may include exploit and malware detection performed by, e.g., the microvisor 300, VMM 1 and VM 1 to detect behaviors of the object. Illustratively, VMM 1 may configure VM 1 with a software profile that replicates (mimics) a proper run-time environment to process the object and/or that the object expects, e.g., if the object content is a web page or PDF file, the VM may be configured with a suitable application program 425, such as a browser or Adobe reader application, respectively. The behaviors of the object may then be detected by instrumenting (i.e., monitoring) the object (using, e.g., instrumentation logic 360A) as the object executes in the guest operating system 415 at VM 1, wherein the monitored run-time behaviors may be captured by the microvisor 300 and VMM 1, and provided to the BALE 410 as dynamic analysis results. In an embodiment, multiple objects may be processed concurrently (overlapping) in the VMs, while in other embodiments, multiple run-time environments may be concurrently or sequentially run to analyze the same object in a single or separate VMs. The VMM 1 may configure the instrumentation logic 360A to monitor different types of objects, such as payloads of network (web) and email packets, although alternatively, there could be separate web-based and email-based MDS appliances, each of which may be deployed in generally the same way and configured to perform detection as generally described herein. For example, the email-based MDS appliance may be deployed in the private network to examine and process attachments using different types of heuristics. The suspicious object may be analyzed to arrive at a malware/non-malware classification based on detected anomalous behaviors during processing of the object (e.g., capability violations captured by VMM 1 and VM 1).

Illustratively, monitors may be employed during the dynamic analysis to monitor the run-time behaviors of the object and capture any resulting activity. The monitors may be embodied as capability violations configured to trace particular operating system events. For example during instrumenting of the object at the VM 1, the system events may trigger capability violations (e.g., exceptions or traps) generated by the microvisor 300 to enable monitoring of the object's behaviors during run-time. In an embodiment, the monitors may be further configured to detect behaviors that appear benign, but when analyzed collectively with other behaviors, may be indicative of malware. The monitors may include breakpoints within code of the process executing the object being monitored. The breakpoints may be configured to trigger capability violations or other processing used to gather or monitor the run-time behaviors. For instance, a breakpoint may be inserted into a section of code of the process (e.g., application 425) running in the guest operating system 415. When the code executes, e.g., in response to the application 425 accessing the object, an interception point may be triggered and a capability violation generated to enable monitoring of the executed code. In other words, an exception may be generated on the breakpoint and execution of the code by the application may be tracked by the microvisor 300 and VMM 1, where the exception is a capability violation.

The dynamic analysis results may be stored in memory 220 (e.g., in event logger 475) and provided (e.g., as input via VMM 0) to the BALE 410, which may provide correlation information (e.g., as an output via VMM 0) to the classifier 420; however, in an embodiment, the BALE may be configured to operate on both static and dynamic analysis results to generate correlation information for the classifier. The BALE 410 may be embodied as a rules-based correlation engine illustratively executing as an isolated process (module) disposed over the microvisor 300 within the architecture 400. In accordance with the malware detection appliance architecture 400, the BALE 410 is illustratively associated with (bound to) a copy of PD 0 (e.g., PD R). The microvisor 300 may copy (i.e., "clone") the data structures (e.g., execution contexts, scheduling contexts and capabilities) of PD 0 to create PD R for the BALE 410, wherein PD R has essentially the same structure as PD 0 except for the capabilities associated with the kernel resources. The capabilities for PD R may limit or restrict access to one or more of the kernel resources as requested through one or more hyper-calls from, e.g., BALE 410 over interface 310r to the microvisor.

In an embodiment, the BALE 410 may be configured to operate on correlation rules that define, among other things, patterns (such as, e.g., sequences) of known malicious behaviors (if-then statements with respect to, e.g., attempts by a process/object to change memory in a certain way that is known to be malicious) that may collectively correlate to malicious events (activity). In some embodiments, the correlation rules may define patterns of known benign behaviors that may collectively correlate to benign (non-malicious) events. The dynamic analysis may collect the monitored behaviors and cooperate with the BALE to examine those behaviors, separately or collectively, as patterns to determine whether they represent malicious or benign events indicative of the presence of malware. For example, a behavior may be detected that appears benign, but when examined with other behaviors, may be indicative of malicious activity. In addition, the BALE may perform correlation of relationships to, e.g., render a determination of a weighted degree of similarity of matched objects based on experiential knowledge. As noted, a VM may be spawned to instrument a suspect process (object) running in a guest operating system and cooperate with the microvisor 300 and VMM 1 to generate capability violations in response to interception points, which capability violations are provided as dynamic analysis result inputs to the BALE 410. The rules of the BALE 410 may then be correlated against those dynamic analysis results to generate correlation information pertaining to, e.g., a level of risk or a numerical score used to arrive at a decision of (deduce) maliciousness.

The classifier 420 may be embodied as a classification engine executing as a user mode process of the operating system kernel 230 and configured to use the correlation information provided by BALE 410 to render a decision as to whether the object is malicious. Illustratively, the classifier 420 may be configured to classify the correlation information, including monitored behaviors (expected and unexpected/anomalous) and capability violations, of the object relative to those of known malware and benign content. That is, a determination of whether the monitored behaviors represent expected or unexpected (anomalous) behaviors is rendered by correlating the monitored behaviors against behaviors of known malware. Results of the static analysis may also be used in the correlation and classification, e.g., by being combined with the results of the dynamic analysis to yield a combined score. In an embodiment, further static analysis and/or dynamic analysis may be performed at the appliance based on the results of correlation and classification engines. For example, an analysis controller (not shown) may be configured to examine the results of the BALE and classifier and, in response, provide the object back to the static and/or dynamic analysis stages for further (static and/or behavioral) analysis.

Illustratively, the BALE 410 and classifier 420 may be implemented as separate modules as described herein although, in an alternative embodiment, the BALE 410 and classifier 420 may be implemented as a single module disposed over (i.e., running on top of) the microvisor 300. The BALE 410 may be configured to correlate observed behaviors (e.g., results of dynamic analysis) with known malware and/or benign objects (embodied as defined rules) and generate an output (e.g., a level of risk or a numerical score associated with an object) that is provided to and used by the classifier 420 to render a decision of malware based on the risk level or score exceeding a probability threshold. A reporting logic engine 470 may execute as a user mode process in the operating system kernel 230 that is configured to generate an alert for transmission external to the MDS $200_M$ (e.g., to one or more other endpoints $200_E$ or to a management appliance) in accordance with "post-solution" activity.

In an embodiment, the MDS $200_M$ may include one or more modules executing as user mode process(es) in the operating system kernel 230 and configured to create indicators (signatures) of detected behaviors of a process/object as indicative of malware and organize those indicators as reports for distribution to the endpoints. To that end, the MDS appliance may include an indicator generator 480 configured to generate the malware indicators for distribution to the endpoints $200_E$. Illustratively, the malware indicators may not be typical code indicators, e.g., anti-virus (AV) signatures; rather, the malware indicators may be embodied as one or more hashes of the object classified as malware, possibly including identification information regarding its characteristics and/or behaviors detected during static and dynamic analysis. The indicator generator 480 may be further configured to generate both malware indicators and typical AV signatures to thereby provide a more robust set of indicators/signatures. These indicators may be used internally by the MDS appliance or distributed externally as original indicator reports to the endpoints.

The original indicator reports may also be provided to an intermediate node $200_I$, such as a management appliance, within the private (customer) network 130, which may be configured to perform a management function to, e.g., distribute the reports to other appliances within the customer network, as well as to nodes within a malware detection services and equipment supplier network (e.g., supplier cloud infrastructure) for verification of the indicators and subsequent distribution to other MDS appliances and/or among other customer networks. Illustratively, the reports distributed by the management appliance may include the entire or portions of the original indicator reports provided by the MDS appliance, or may include new reports that are derived from the original reports. An indicator scanner 490 may be embodied as a user mode process and configured to obviate (prevent) processing of a suspect process/object based on the robust set of indicators in the report. For example, the indicator scanner 490 may perform indicator comparison and/or matching during static analysis while the suspect process/object is instrumented by the VM. In response to a match, the indicator scanner 490 may cooperate with the microvisor 300 to terminate execution of the process/object.

In one or more embodiments, the MDS appliance $200_M$ may be equipped with capabilities to defeat countermeasures employed by known malware, e.g., where malware may detect that it (i.e., process/object) is running on the microvisor 300 (e.g., through exposure of environmental signatures that can be used to identify the microvisor). In accordance with the malware detection appliance architecture 400, such behavior may be used to qualify suspiciousness. For example if a suspect object attempts to "sleep," the microvisor 300 and VMM 1 may detect such sleeping activity and may be able to accelerate sleeping. A sleep system call (which may also be provided by a library) may be issued by an object executed by an application to request sleeping and a capability violation may be triggered based on the call (interception point) to determine, e.g., the length of time the object requests to sleep and whether the time may be accelerated. Here, a breakpoint may be inserted into, e.g., the object to accelerate the sleeping time, assuming there is an appropriate heuristic enabling such acceleration. It should be noted that it may not always be desirable to accelerate sleeping because e.g., a shortened sleeping time may, in an embodiment, sever communication mechanisms between applications/processes. However, if such sleeping is associated with a type of malware behavior, acceleration may be performed.

The object may implement measures to identify that it is running in a microvisor environment; accordingly, the MDS $200_M$ may implement countermeasures to provide strong isolation of the object during execution. The object may then execute and manifest behaviors that are captured by the microvisor and VMM 1. In other words, the microvisor and VMM 1 may detect (as a suspicious fact) that the suspect object has detected the microvisor. The object may then be allowed to run (while hiding the suspicious fact) and its behaviors detected. The microvisor 300 and VMM 1 may record the activity, including the detected suspicious fact, as an event with another user mode process embodied as the event logger 475. In addition, the event may be provided to the correlation engine (BALE 410) and classification engine (classifier 420) for possible classification as malware.

Figure 5:
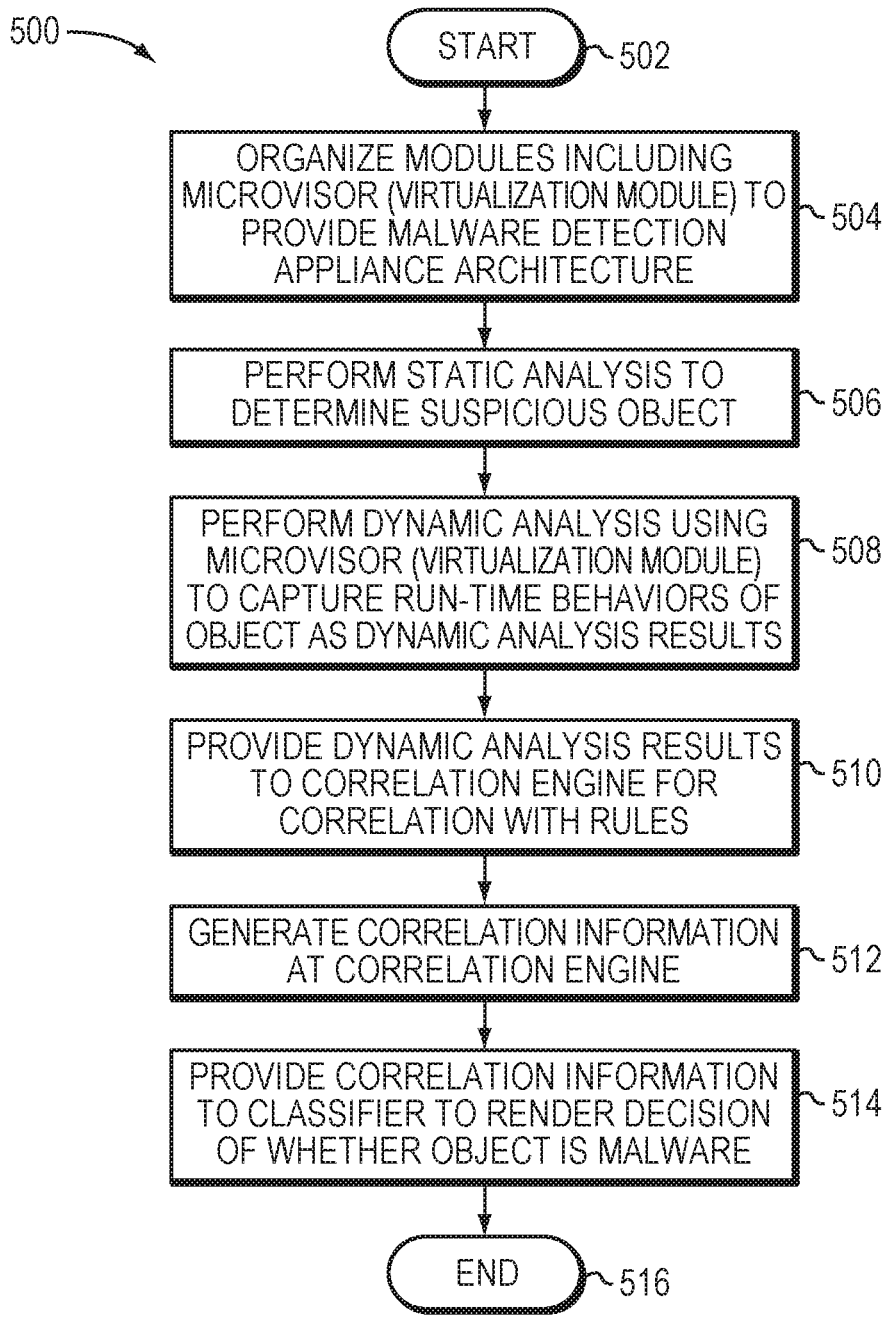
FIG. 5 is an example procedure for deploying the threat-aware microvisor in a malware detection appliance architecture.

FIG. 5 is an example procedure for deploying the threat-aware microvisor in a malware detection appliance architecture to provide exploit and malware detection on an object as it executes in a guest operating system on the appliance. The procedure 500 starts at step 502 and proceeds to step 504 where a plurality of software modules or engines, including the microvisor, as well as VMM 0, VMM 1 and VM 1, executing on the appliance are organized to provide the malware detection appliance architecture. At step 506, static analysis of the object may be performed by, e.g., a static analysis engine and a heuristics engine to determine a suspicious object. At step 508, dynamic analysis may be performed on the suspicious object by, e.g., the microvisor, VMM 1 and VM 1 to capture run-time behaviors of the object as dynamic analysis results. At step 510, the dynamic analysis results may be provided to a correlation engine (BALE) for correlation with correlation rules and, at step 512, the correlation engine may generate correlation information. At step 514, the correlation information may be provided to a classifier to render a decision of whether the object is malware. The procedure then ends at step 516.

Trusted Computing Base (TCB)

In an embodiment, the microvisor 300 may be stored in memory as a module of a trusted computing base (TCB) that also includes a root task module (hereinafter "root task") configured to cooperate with the microvisor to create (i.e., load) one or more other modules executing on the CPU 212 of the MDS appliance $200_M$. In addition, one or more of the malware detection system engines (modules) described herein may be included in the TCB to provide a trusted malware detection environment. For example, the BALE 410 may be loaded and included as a module in the TCB for the appliance $200_M$.

Figure 6:
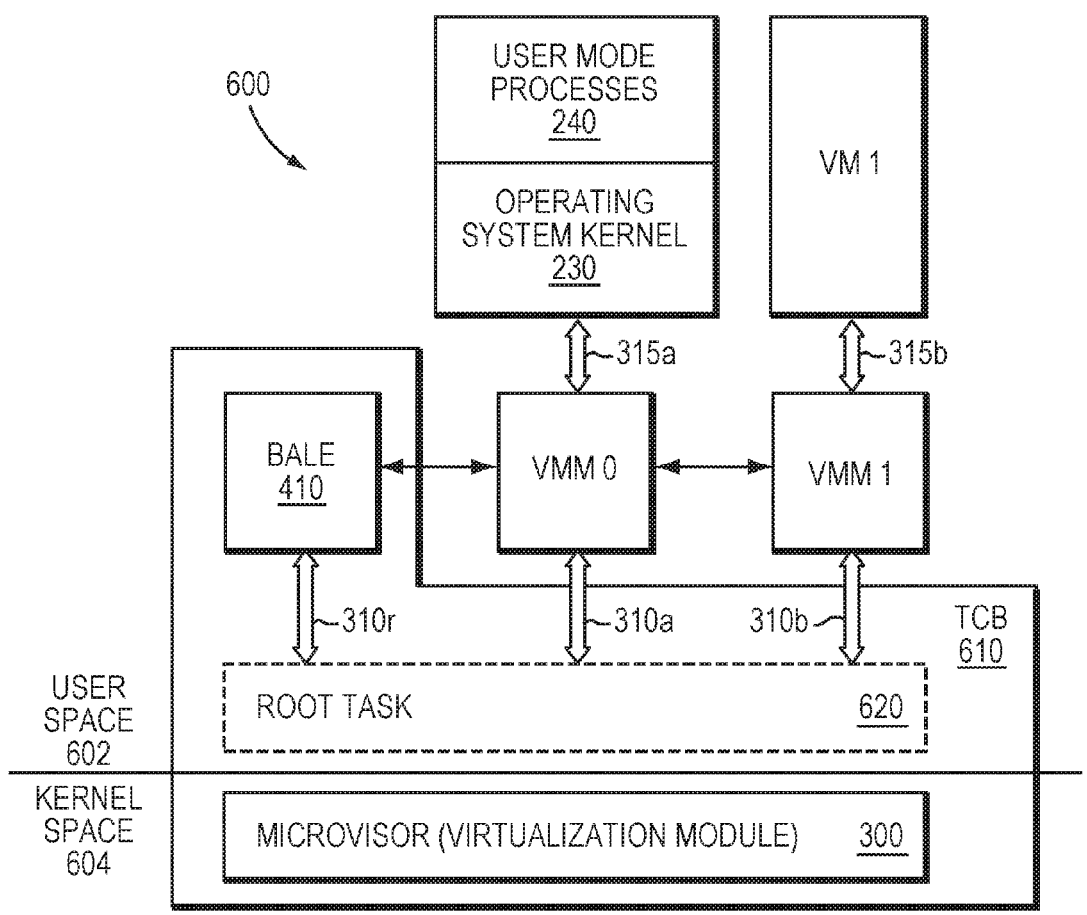
FIG. 6 is a block diagram of an exemplary virtualization architecture including a trusted computing base that may be configured to provide a trusted malware detection environment in accordance with one or more embodiments described herein.

FIG. 6 is a block diagram of an exemplary virtualization architecture 600 including a TCB 610 that may be configured to provide a trusted malware detection environment in accordance with one or more embodiments described herein. The microvisor 300 may be disposed as a relatively small code base that underlies the operating system kernel 230 and executes in kernel space 604 of the architecture 600 to control access to the kernel resources for any operating system process (kernel or user mode). As noted, the microvisor 300 executes at the highest privilege level of the hardware (CPU) to virtualize access to the kernel resources of the appliance in a light-weight manner. The root task 620 may be disposed as a relatively small code base that overlays the microvisor 300 (i.e., underlies VMM 0 and VMM 1) and executes in user space 602 of the architecture 600. Through cooperation (e.g., communication) with the microvisor, the root task 620 may also initialize (i.e., initially configure) the loaded modules executing in the user space 602. For example, the root task 620 may initially configure and load the BALE 410 as a module of the TCB 610.

In an embodiment, the root task 620 may execute at the highest (absolute) privilege level of the microvisor. Illustratively, the root task 620 may communicate with the microvisor 300 to allocate the kernel resources to the loaded user space modules. In this context, allocation of the kernel resources may include creation of, e.g., maximal capabilities that specify an extent to which each module (such as, e.g., VMM 0, VMM 1 and/or BALE 410) may access its allocated resource(s). For example, the root task 620 may communicate with the microvisor 300 through instructions to allocate memory and/or CPU resource(s) to VMM 0, VMM 1 and BALE 410, and to create capabilities that specify maximal permissions allocated to VMM 0, VMM 1 and BALE 410 when attempting to access (use) the resource(s). Such instructions may be provided over a privileged interface embodied as one or more hyper-calls. Notably, the root task 620 is the only (software or hardware) entity that can instruct the microvisor with respect to initial configuration of such resources.

In an embodiment, the root task 620 may be implemented as a "non-long lived" process that terminates after creation and initial configuration of the user space processes (modules). The non-long lived nature of the root task is depicted by dash lining of the root task 620 in FIG. 6. Illustratively, the root task 620 is the first user space process to boot (appear) during power-up and initialization of the appliance, including loading and initial configuration of the user space modules and their associated capabilities; the root task then terminates (disappears). The root task 620 may thereafter be re-instantiated (reappear) during a reboot process, which may be invoked in response to an administrative task, e.g., update of VMM 0. Notably, the root task 620 may only appear and operate on the appliance in response to a (re)boot process, thereby enhancing security of the TCB 610 by restricting the ability to (re)initialize the microvisor 300 after deployment on the MDS appliance $200_M$.

As a trusted module of the TCB, the microvisor 300 is illustratively configured to enforce a security policy of the TCB that, e.g., prevents (obviates) alteration or corruption of a state related to security of the microvisor by a module (e.g., software entity) of or external to an environment in which the microvisor 300 operates, i.e., the TCB 610. For example, an exemplary security policy may provide, "modules of the TCB shall be immutable," which may be implemented as a security property of the microvisor, an example of which is no module of the TCB modifies a state related to security of the microvisor without authorization. In an embodiment, the security policy of the TCB 610 may be implemented by a plurality of security properties of the microvisor 300. That is, the exemplary security policy may be also implemented (i.e., enforced) by another security property of the microvisor, another example of which is no module external to the TCB modifies a state related to security of the microvisor without authorization. As such, one or more security properties of the microvisor may operate concurrently to enforce the security policy of the TCB. An example trusted threat-aware microvisor is described in U.S. patent application Ser. No. 14/602,023 titled Trusted Threat-Aware Microvisor by Ismael et al., published on Jan. 7, 2016 as 2016/0006756 A1 having a priority date of Jul. 1, 2014.

Illustratively, the microvisor 300 may manifest (i.e., demonstrate) the security property in a manner that enforces the security policy. Accordingly, verification of the microvisor to demonstrate the security property necessarily enforces the security policy, i.e., the microvisor 300 may be trusted by demonstrating the security property. Trusted (or trustedness) may therefore denote a predetermined level of confidence that the microvisor demonstrates the security property (i.e., the security property is a property of the microvisor). It should be noted that trustedness may be extended to other security properties of the microvisor, as appropriate. Furthermore, trustedness may denote a predetermined level of confidence that is appropriate for a particular use or deployment of the microvisor 300 (and TCB 610). The predetermined level of confidence, in turn, is based on an assurance (i.e., grounds) that the microvisor demonstrates the security property. Therefore, manifestation denotes a demonstrated implementation that assurance is provided regarding the implementation based on an evaluation assurance level, i.e., the more extensive the evaluation, the greater the assurance level. Evaluation assurance levels for security are well-known and described in *Common Criteria for Information Technology Security Evaluation Part 3: Security Assurance Components*, September 2012, Ver. 3.1 (CCMB-2012-09-003).

While there have been shown and described illustrative embodiments for deploying the threat-aware microvisor in a malware detection appliance architecture executing on an appliance to provide exploit and malware detection within a network environment, it is to be understood that various other adaptations and modifications may be made within the spirit and scope of the embodiments herein. For example, embodiments have been shown and described herein with relation to providing a trusted malware detection environment having a TCB 610 that includes the BALE 410 as well as the microvisor 300 and root task 620. However, the embodiments in their broader sense are not so limited, and may, in fact, allow organization of other modules associated with a decision of malware to be part of the TCB. For example, the BALE 410 and classifier 420 may be loaded and included as modules in the TCB 610 for the MDS appliance $200_M$ to provide the trusted malware detection environment. Moreover, if the software code associated with the BALE and/or classifier is too large and complex to verify as trusted, those modules may still be configured and disposed to run over the microvisor for isolation purposes, i.e., to isolate any malware in the module(s) by preventing access (via hyper calls) to other module(s) of the malware detection environment.

In addition, embodiments have been shown and described herein with relation to dynamic analysis of one or more operating system processes or objects using various instantiations of instrumentation logic 350, 350A-N, 360, 360A. For example, instrumentation logic 350 may be included in VMM 0 to examine a state of a process issuing an interception point (such as a system call) to determine whether the interception point is suspicious, whereas instrumentation logic 360A may be included in VM 1 to instrument (monitor) an object to detect its behaviors as the object executes in a guest operating system. The states and behaviors may be provided as dynamic analysis results to BALE, which may correlate the results against correlation rules to generate a risk level or numerical score used in a decision of maliciousness. However, the embodiments in their broader sense are not so limited and may allow for a subset of the instrumentation logic situated within (or outside of) VMs and VMMs, yet still configured to provide examination of interception points and monitoring of behaviors, including application of heuristics, as well as interaction with the BALE as described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
deploying a virtualization module in a malware detection appliance architecture of an appliance coupled to a network, the virtualization module directly disposed on native hardware of the appliance and having a main protection domain including one or more execution contexts and capabilities defining permissions for a process to access kernel resources of the appliance;
disposing a hypervisor over the virtualization module, the hypervisor operating under control of the virtualization module to spawn a virtual machine configured to contain a guest operating system and instrumentation logic, the virtual machine bound to a clone of the main protection domain representative of the guest operating system;
performing dynamic analysis of the process when executing an object to detect first behaviors of the object via one or more capability violations as the process executes in the virtual machine, the one or more capability violations generated by the virtualization module at the clone of the main protection domain, wherein the first behaviors are captured as dynamic analysis results;
correlating the dynamic analysis results against correlation rules to generate correlation information pertaining to a level of risk used to arrive at a decision of maliciousness; and
rendering, by the appliance, a decision of whether the object is malicious by classifying the correlation information of the object relative to known malware and benign content.

2. The method of claim 1 further comprising creating the clone of the main protection domain by copying the execution contexts and capabilities of the main protection domain, wherein the capabilities of the clone of the main protection domain are more restricted than the capabilities of the main protection domain with respect to access to the kernel resources.

3. The method of claim 1 further comprising configuring the virtual machine with a software profile that replicates a run-time environment that the object expects.

4. The method of claim 3 wherein the object is a web page and wherein configuring the virtual machine comprises configuring the virtual machine with a browser application.

5. The method of claim 1 further comprising:
collecting second behaviors detected during dynamic analysis of the object, wherein the second behaviors are detected without capability violations; and
examining the first and second behaviors to determine whether the behaviors represent one of malicious and benign events indicative of a presence of malware.

6. The method of claim 1 further comprising performing static analysis of the object to determine whether the object is suspicious, wherein performing the static analysis includes running one or more heuristics using weighting to determine whether the object is suspicious.

7. The method of claim 6 further comprising performing the static analysis followed by the dynamic analysis in accordance with a sequential two-phase approach, wherein the object is subjected to dynamic analysis if the object is determined suspicious by the static analysis.

8. A system comprising:
a memory of a malware detection system (MDS) appliance coupled to a network, the memory configured to store an operating system process, a hypervisor and a virtualization module, the hypervisor disposed over the virtualization module and operating under control of the virtualization module in a malware detection appliance architecture of the MDS appliance, the virtualization module directly disposed on native hardware of the appliance and having a main protection domain including one or more execution contexts and capabilities defining permissions for the operating system process to access kernel resources of the appliance; and
a processing unit coupled to the memory and adapted to execute the operating system process, the hypervisor, and the virtualization module, wherein the hypervisor and the virtualization module are configured to:
create a virtual machine containing a guest operating system and instrumentation logic, the virtual machine bound to a clone of the main protection domain representative of the guest operating system;
perform dynamic analysis of the operating system process when executing an object to observe behaviors of the object via one or more capability violations as the operating system process executes in the virtual machine, the one or more capability violations generated by the virtualization module at the clone of the main protection domain, wherein the behaviors are captured as dynamic analysis results;
correlate the dynamic analysis results against correlation rules to generate correlation information pertaining to a level of risk used to arrive at a decision of maliciousness; and
render a decision of whether the object is malicious by classifying the correlation information of the object relative to known malware and benign content.

9. The system of claim 8 wherein the virtualization module is further configured to create the clone of the main protection domain by copying the execution contexts and capabilities of the main protection domain, wherein the capabilities of the clone of the main protection domain are more restricted than the capabilities of the main protection domain with respect to access to the kernel resources.

10. The system of claim 8 wherein the hypervisor is further configured to configure the virtual machine with a software profile that replicates a run-time environment that the object expects.

11. The system of claim 10 wherein the object is a web page and wherein the hypervisor is further configured to configure the virtual machine with a browser application.

12. The system of claim 8 wherein the hypervisor is further configured to configure the instrumentation logic to monitor different types of objects including payloads of network or email packets.

13. The system of claim 8 wherein the memory is further configured to store user mode processes executable by the processing unit, the user mode processes configured to perform static analysis of the object to determine whether the object is suspicious, wherein performing the static analysis includes running one or more heuristics using weighting to determine whether the object is suspicious.

14. The system of claim 13 wherein the user mode processes are further configured to perform the static analysis followed by the dynamic analysis in accordance with a sequential two-phase approach, wherein the object is subjected to dynamic analysis if the object is determined suspicious by the static analysis.

15. The system of claim 14 wherein the user mode processes are further configured to perform scheduling of the dynamic analysis of the object in accordance with a priority based on a static analysis score for the object.

16. The system of claim 8 further comprising a network interface coupling the memory to the network, the network interface operating as a network tap to receive incoming data traffic from the network and provide one of at least some of the data traffic and a duplicated copy of the traffic for malware detection.

17. The system of claim 16 wherein the MDS appliance is deployed in-line with one or more endpoints to subject the incoming data traffic to static analysis and block the traffic that is classified as malware from reaching the endpoints.

18. A non-transitory computer readable medium including program instructions for execution on one or more processors of a malware detection system (MDS) appliance, the program instructions configured to:

create a virtual machine containing a guest operating system and instrumentation logic, the virtual machine bound to a clone of a main protection domain of a virtualization module stored in a memory of the MDS appliance, the main protection domain representative of the guest operating system;

perform dynamic analysis of an operating system process when executing an object to observe behaviors of the object via one or more capability violations as the operating system process executes in the virtual machine, the one or more capability violations generated by the virtualization module at the clone of the main protection domain, wherein the behaviors are captured as dynamic analysis results;

correlate the dynamic analysis results against correlation rules to generate correlation information pertaining to a level of risk used to arrive at a decision of maliciousness; and render a decision of whether the object is malicious by classifying the correlation information of the object relative to known malware and benign content.

19. The method of claim 1, wherein the virtualization module includes a subset functionality of the hypervisor.

20. The system of claim 8, wherein the virtualization module includes a subset functionality of the hypervisor.

21. The computer readable medium of claim 18, wherein the virtualization module includes a subset functionality of a hypervisor.

* * * * *